(12) United States Patent
Wang et al.

(10) Patent No.: US 12,013,173 B2
(45) Date of Patent: Jun. 18, 2024

(54) REFRIGERATING AND FREEZING DEVICE

(71) Applicants: QINGDAO HAIER REFRIGERATOR CO., LTD., Shandong (CN); HAIER SMART HOME CO., LTD., Shandong (CN)

(72) Inventors: Haijuan Wang, Qingdao (CN); Peng Li, Qingdao (CN); Dongqiang Cao, Qingdao (CN); Sen Mu, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 396 days.

(21) Appl. No.: 17/431,222

(22) PCT Filed: Feb. 11, 2020

(86) PCT No.: PCT/CN2020/074739
§ 371 (c)(1),
(2) Date: Aug. 16, 2021

(87) PCT Pub. No.: WO2020/168945
PCT Pub. Date: Aug. 27, 2020

(65) Prior Publication Data
US 2022/0113084 A1 Apr. 14, 2022

(30) Foreign Application Priority Data
Feb. 19, 2019 (CN) .......................... 201920210472.8

(51) Int. Cl.
*F25D 23/12* (2006.01)
*F25D 11/02* (2006.01)
(Continued)

(52) U.S. Cl.
CPC .............. *F25D 23/12* (2013.01); *F25D 11/02* (2013.01); *F25D 17/062* (2013.01);
(Continued)

(58) Field of Classification Search
CPC ........ F25D 23/12; F25D 11/02; F25D 17/062; F25D 31/005; F25D 2400/02
See application file for complete search history.

(56) References Cited

U.S. PATENT DOCUMENTS

2018/0187944 A1 7/2018 Park et al.
2020/0109891 A1 4/2020 Xu et al.

FOREIGN PATENT DOCUMENTS

CN 2193519 Y 3/1995
CN 2811886 Y 8/2006
(Continued)

OTHER PUBLICATIONS

WO-2018223939-A1 translation.*
(Continued)

*Primary Examiner* — Elizabeth J Martin
(74) *Attorney, Agent, or Firm* — ALSTON & BIRD LLP (57) ABSTRACT

A refrigerating and freezing device (1) includes a cabinet, wherein at least one storage compartment (11) is defined therein, and a heating cavity is defined in one of the storage compartments (11); and an electromagnetic heating device, configured to supply electromagnetic waves into the heating cavity so as to heat a to-be-processed object in the heating cavity, wherein the electromagnetic heating device is provided with an electromagnetic generation module (21) configured to produce an electromagnetic wave signal. A containing groove (12) with an upward opening is provided in a top of the cabinet (10), the opening of the containing groove (12) is covered with a cover (13) so as to define a containing space (14) between the containing groove (12)
(Continued)

and the cover (13), and heat dissipation holes configured to achieve communication between the containing space (14) and an external environment where the cabinet (10) is located are provided in the cover (13). The electromagnetic generation module (21) is disposed in the containing space (14), and a heat dissipation fan (31) is further provided in the containing space (14) and is configured to drive airflow to flow between the containing space (14) and the external environment where the cabinet (10) is located through the heat dissipation holes, so as to dissipate heat from the electromagnetic generation module (21). The heat dissipation efficiency and the heat dissipation effect are improved, and the space inside the cabinet (10) is prevented from being occupied.

10 Claims, 4 Drawing Sheets

(51) Int. Cl.
    *F25D 17/06*     (2006.01)
    *F25D 31/00*     (2006.01)
    *H05B 6/64*     (2006.01)

(52) U.S. Cl.
    CPC ........... *F25D 31/005* (2013.01); *H05B 6/642* (2013.01); *F25D 2400/02* (2013.01)

(56) References Cited

FOREIGN PATENT DOCUMENTS

| | | | |
|---|---|---|---|
| CN | 101043806 A | | 9/2007 |
| CN | 109323517 A | | 2/2019 |
| CN | 209893723 U | | 1/2020 |
| EP | 3926260 | | 12/2021 |
| JP | 0791796 A | | 4/1995 |
| JP | 2004-286346 A | | 10/2004 |
| JP | 2004286346 A | * | 10/2004 |
| KR | 20050022546 A | | 3/2005 |
| WO | WO 2011/118198 A1 | | 9/2011 |
| WO | WO 2018/223939 A1 | | 12/2018 |
| WO | WO-2018223939 A1 | * | 12/2018 ............... A23B 4/07 |

OTHER PUBLICATIONS

JP-2004286346-A translation.*
Supplementary European Search Report for EP Application No. 20758652.0 dated Mar. 11, 2022 (4 pages).
1st Office Action for India Application No. 202137037336 dated Mar. 7, 2022 (7 pages).
1st Office Action for EP Application No. 20758652.0 dated Mar. 23, 2022 (5 pages).
1st Office Action for Australia Application No. 2020226423 dated Apr. 27, 2022 (3 pages).
International Search Report for PCT/CN2020/074739 (ISA/CN) dated Apr. 21, 2020 (5 pages).

* cited by examiner

REFRIGERATING AND FREEZING DEVICE

TECHNICAL FIELD

The present invention relates to the field of refrigerating and freezing, and in particular, to a refrigerating and freezing device.

BACKGROUND ART

The quality of food is maintained during freezing. However, the frozen food needs to be heated before being processed or eaten. In order to facilitate users freezing and heating food, in the prior art, food is generally heated by disposing a heating device or a microwave device in a refrigerator and other refrigerating and freezing devices. However, a long heating time is generally required for heating food by the heating device, and the heating time and temperature are not easy to control, such that moisture evaporation and juice loss of food are easily caused, and the quality of food is lost. Heating food by microwave devices is fast and efficient, so the loss of nutritional ingredients in food is very low. However, due to the difference in the penetration of microwave to water and ice and absorption of water and ice to microwave, and the uneven distribution of internal substances in food, the energy absorbed in the melted area is more, which easily causes uneven heating and local overheating.

In order to avoid the problems above, the applicant of this application previously proposed an electromagnetic heating method with good heating effect, but the previous electromagnetic heating device would occupy too much heating space, and the heat generated by the electromagnetic heating device itself is not easy to dissipate, thus affecting the heating effect.

SUMMARY OF THE INVENTION

One objective of the present invention is to overcome at least one of the defects of the prior art and provide a refrigerating and freezing device with a large heating space and a high space utilization rate.

Another objective of the present invention is to rapidly and effectively cool an electromagnetic generation module in the refrigerating and freezing device so as to improve the heating efficiency and the heating effect and prolong the service life of the electromagnetic generation module.

A further objective of the present invention is to avoid the electromagnetic generation module from being affected by damp or dust deposit.

In order to achieve the objectives above, the present invention provides a refrigerating and freezing device, including:
  a cabinet, wherein at least one storage compartment is defined therein, and a heating cavity configured to contain a to-be-processed object is defined in one of the storage compartments; and
  an electromagnetic heating device, configured to supply electromagnetic waves into the heating cavity so as to heat the to-be-processed object in the heating cavity, wherein the electromagnetic heating device is provided with an electromagnetic generation module configured to produce an electromagnetic wave signal, wherein
  a containing groove with an upward opening is provided in a top of the cabinet, the opening of the containing groove is covered with a cover so as to define a containing space between the containing groove and the cover, and heat dissipation holes configured to achieve communication between the containing space and an external environment where the cabinet is located are provided in the cover; and
  the electromagnetic generation module is disposed in the containing space, and a heat dissipation fan is further provided in the containing space and is configured to drive airflow to flow between the containing space and the external environment where the cabinet is located through the heat dissipation holes, so as to dissipate heat from the electromagnetic generation module.

Optionally, the cover comprises a top wall and a peripheral wall extending downwards from a periphery of the top wall; and
  the heat dissipation holes include a plurality of air inlet holes provided in a first side wall of the peripheral wall and a plurality of air outlet holes provided in a second side wall of the peripheral wall opposite to the first side wall, so as to allow the airflow driven by the heat dissipation fan to enter the containing space through the plurality of air inlet holes and flow out through the plurality of air outlet holes, and thus forced convection heat dissipation is carried out on the electromagnetic generation module.

Optionally, a plurality of heat dissipation fins are further provided in the containing space for assisting in dissipating heat from the electromagnetic generation module.

Optionally, the plurality of heat dissipation fins are disposed on a surface of the electromagnetic generation module side by side at intervals; and the side-by-side direction of the plurality of heat dissipation fins is set such that a gap between every two adjacent heat dissipation fins coincides with a flow direction of the airflow in the containing space, so that the airflow flows through the gap between every two adjacent heat dissipation fins and then flows out through the air outlet holes.

Optionally, the heat dissipation fan and the plurality of heat dissipation fins are both disposed on an upper surface of the electromagnetic generation module. The heat dissipation fan is located on one side of the heat dissipation fins adjacent to the air inlet holes, and an air outlet of the heat dissipation fan faces towards the plurality of heat dissipation fins.

Optionally, two heat dissipation fans are provided, and the two heat dissipation fans are disposed side by side in the side-by-side direction of the plurality of heat dissipation fins.

Optionally, the cover further includes a water retaining rib extending downwards from the top wall thereof and adjacently located on an inner side of the peripheral wall thereof, so as to prevent external water from entering the containing space.

Optionally, the water retaining rib surrounds the periphery of the electromagnetic generation module, and rib plates of the water retaining rib opposite to the first side wall and the second side wall are provided with through holes respectively to allow airflow to flow therethrough.

Optionally, a storage device with a cylinder and a door is placed in one of the storage compartments, and the heating cavity is formed in the storage device.

The electromagnetic heating device further includes a radiation antenna and a signal processing and measurement control circuit which are disposed in the cylinder. The radiation antenna is electrically connected with the signal processing and measurement control circuit, and the electromagnetic generation module is electrically connected with the signal processing and measurement control circuit through a wire predisposed in a foaming layer of the cabinet and then is electrically connected with the radiation antenna.

Optionally, the signal processing and measurement control circuit is provided with a first radio frequency port and a first signal transmission interface which are led out from a rear wall of the storage device. The electromagnetic generation module is provided with a second radio frequency port and a second signal transmission interface. The first radio frequency port is connected with the second radio frequency port through a radio frequency cable predisposed in the foaming layer of the cabinet, and the first signal transmission interface is connected with the second signal transmission interface through a signal transmission cable predisposed in the foaming layer of the cabinet.

The refrigerating and freezing device of the present invention is provided with the electromagnetic heating device which uses electromagnetic waves to heat and thaw the to-be-processed object, etc. It has high heating efficiency and uniform heating, and can guarantee food quality. Particularly, the electromagnetic generation module of the electromagnetic heating device is disposed in the containing space formed by the containing groove and the cover at the top of the cabinet. That is, the electromagnetic generation module is located outside the cabinet and does not occupy a storage space in the cabinet and a heating space in the heating cavity. Both the storage space and the heating space are relatively large, and the space utilization rate is high.

Meanwhile, due to the fact that the electromagnetic generation module is located at the top outside the cabinet, heat generated by the electromagnetic generation module will not be dissipated in the cabinet to influence the storage temperature in the storage compartments. More importantly, the heat dissipation holes are disposed in the cover, the heat dissipation fans are further provided in the containing space, and airflow can be driven by the heat dissipation fans to flow to promote heat generated by the electromagnetic generation module to be dissipated to an external environment space. Therefore, the electromagnetic generation module is cooled rapidly and effectively, thus the heating efficiency and the heating effect are improved, and the service life thereof is prolonged.

Further, due to the arrangement of the cover, the electromagnetic generation module may be prevented from being sprinkled by water or sticking dust and the like to a certain extent. The water retaining rib is particularly designed in the cover, and the water retaining rib is located on the inner side of the peripheral wall of the cover, so that water at the top of the cabinet can be prevented from immersing into the containing space, causing the electromagnetic generation module to be affected by damp or dust deposit and even causing unnecessary potential safety hazards.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In the accompanying drawings.

DETAILED DESCRIPTION OF THE INVENTION

Figure 1:
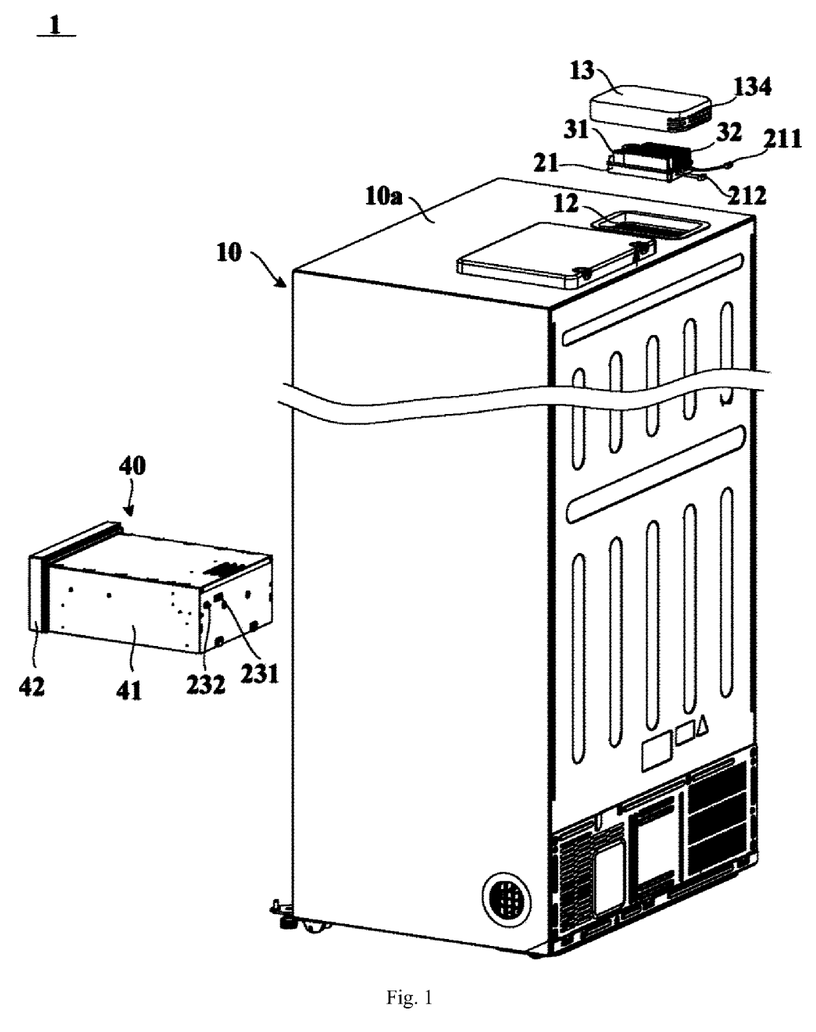
FIG. 1 is a schematic structural diagram of a refrigerating and freezing device according to an embodiment of the present invention.

The present invention provides a refrigerating and freezing device which may be a refrigerator, a freezer or other storage devices with refrigerating and/or freezing functions. FIG. 1 is a schematic structural diagram of a refrigerating and freezing device according to an embodiment of the present invention, and FIG. 2 is a schematic sectional view of a refrigerating and freezing device according to an embodiment of the present invention.

Figure 2:
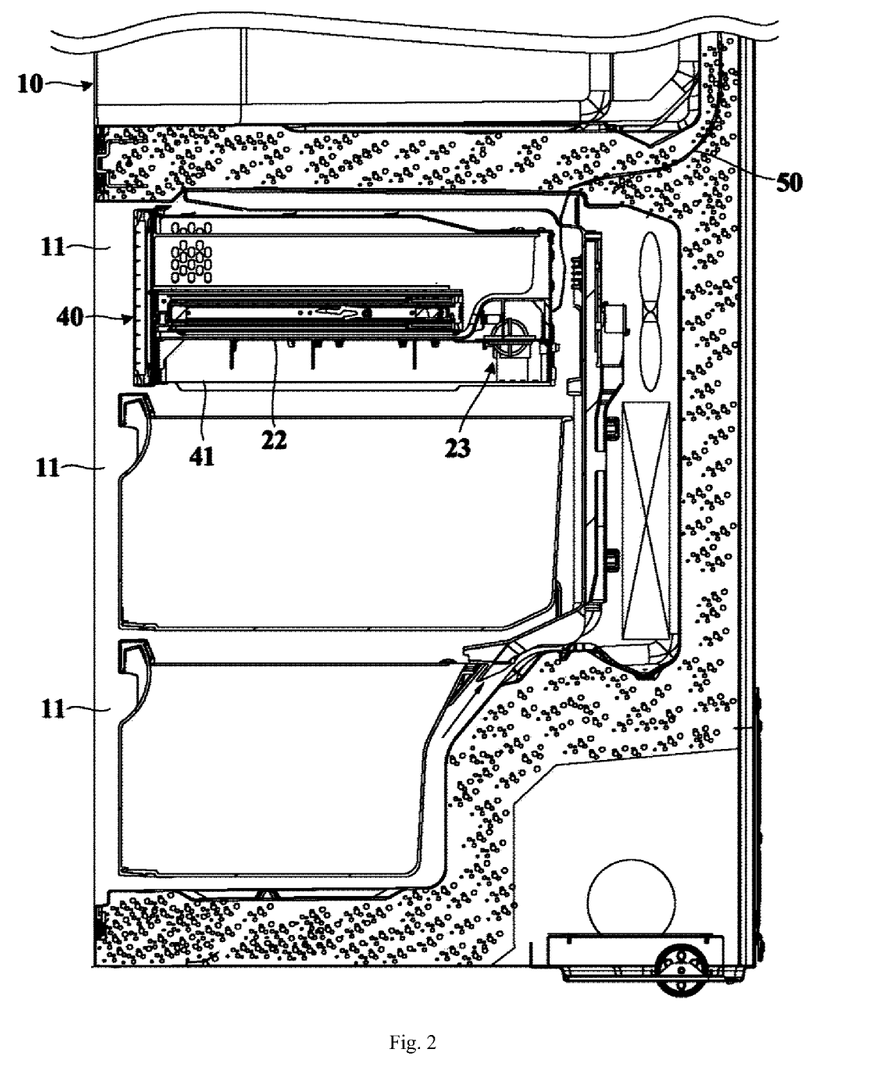
FIG. 2 is a schematic sectional view of a refrigerating and freezing device according to an embodiment of the present invention.

With reference to FIGS. 1-2, the refrigerating and freezing device 1 of the present invention includes a cabinet 10. At least one storage compartment 11 is defined in the cabinet 10. Further, the refrigerating and freezing device 1 may also include a door for opening and/or closing the storage compartments 11. A heating cavity configured to contain a to-be-processed object is defined in one of the storage compartments 11. The heating cavity may heat and thaw the to-be-processed object, etc. Particularly, a plurality of storage compartments 11 may be defined in the cabinet 10, and may include, for example, a refrigerating compartment, a freezing compartment and a variable temperature compartment. The temperatures of the compartments above are different from one another, and therefore functions are different. The heating cavity may be formed in any one of the refrigerating compartment, the freezing compartment and the variable temperature compartment.

Further, the refrigerating and freezing device 1 further includes an electromagnetic heating device configured to supply electromagnetic waves into the heating cavity to heat the to-be-processed object in the heating cavity. The electromagnetic waves provided by the electromagnetic heating device may be electromagnetic waves with a suitable wavelength such as a radio frequency wave, a microwave, and the like. The method of using electromagnetic waves to heat the to-be-processed object has high heating efficiency and uniform heating, and can guarantee food quality. The electromagnetic heating device is generally provided with an electromagnetic generation module 21 configured to produce an electromagnetic wave signal.

Particularly, a top of the cabinet 10 is provided with a containing groove 12 with an upward opening. The containing groove 12 may be formed by a downward depression of a top surface 10a of the cabinet 10. The opening of the containing groove 12 is covered with a cover 13 so as to define a containing space 14 between the containing groove 12 and the cover 13. Heat dissipation holes configured to achieve communication between the containing space 14 and an external environment where the cabinet 10 is located are provided in the cover 13. The electromagnetic generation module 21 is disposed in the containing space 14. Heat dissipation fans 31 are further provided in the containing space 14 and are configured to drive airflow to flow between the containing space 14 and the external environment where the cabinet 10 is located through the heat dissipation holes, so as to dissipate heat from the electromagnetic generation module 21.

Because the electromagnetic generation module 21 of the electromagnetic heating device is disposed in the containing space 14 formed by the containing groove 12 and the cover 13 at the top of the cabinet 10, that is, the electromagnetic generation module 21 is located outside the cabinet 10, and does not occupy a storage space in the cabinet 10 and a heating space in the heating cavity, the storage space and the heating space are relatively large, and the space utilization rate is high.

Meanwhile, because the electromagnetic generation module 21 with high power is located at the top outside the cabinet 10, the heat generated by the electromagnetic generation module will not be dissipated in the cabinet 10 to influence the storage temperature in the storage compartments. More importantly, the heat dissipation holes are disposed in the cover 13, and the heat generated by the electromagnetic generation module 21 may be dissipated through the heat dissipation holes. Further, the heat dissipation fans 31 are further provided in the containing space 14. The heat dissipation fans 31 may drive the airflow to flow more rapidly, so that the heat generated by the electromagnetic generation module 21 is promoted to be dissipated to the external environment space more rapidly. Accordingly, the electromagnetic generation module 21 is cooled rapidly and effectively, the heating efficiency and the heating effect are improved, and the service life thereof is prolonged.

Figure 3:
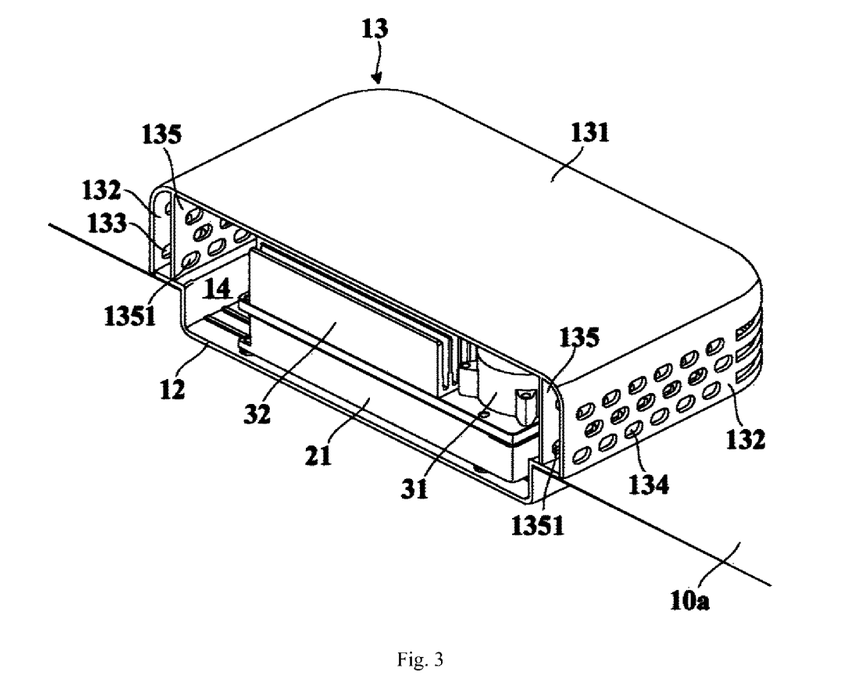
FIG. 3 and FIG. 4 are schematic sectional views of a containing groove and a cover in different directions according to an embodiment of the present invention.
Figure 4:
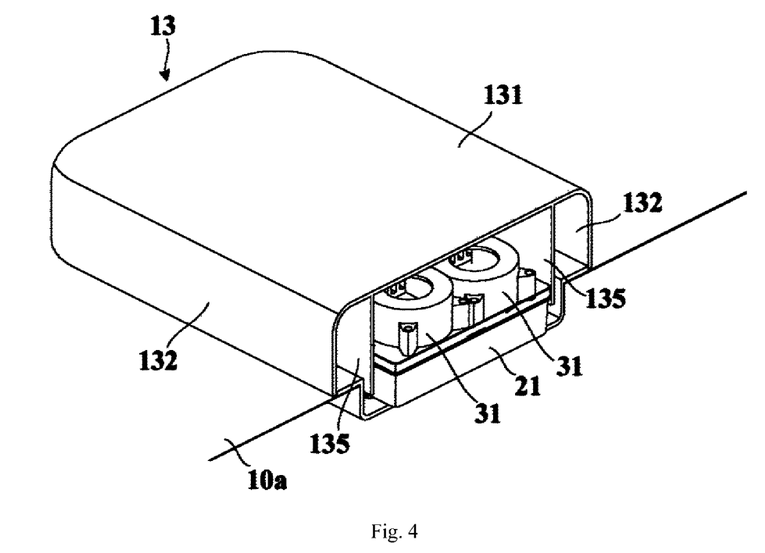
Figure 5:
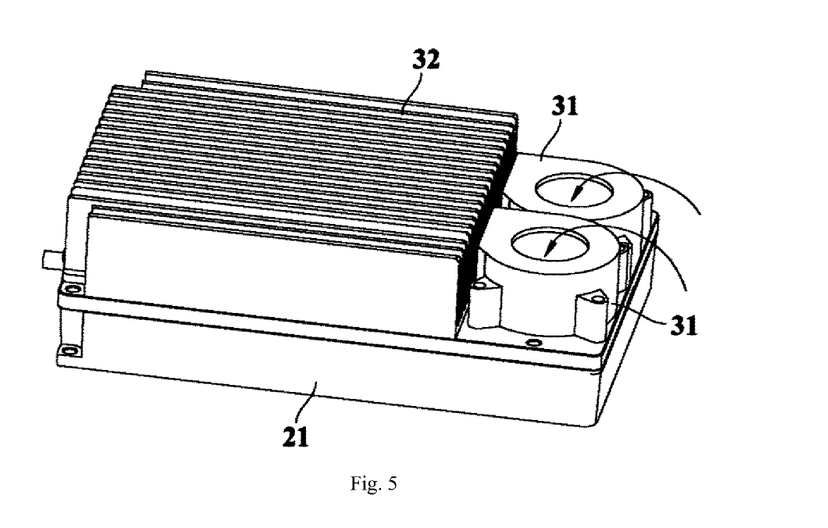
FIG. 5 is a schematic structural diagram of an electromagnetic generation module, heat dissipation fins and heat dissipation fans assembled according to an embodiment of the present invention.

FIG. 3 and FIG. 4 are schematic sectional views of a containing groove and a cover in different directions according to an embodiment of the present invention. Sectional cutting lines in FIG. 3 and FIG. 4 are perpendicular to each other. FIG. 5 is a schematic structural diagram of an electromagnetic generation module, heat dissipation fins and heat dissipation fans assembled according to an embodiment of the present invention. Curved arrows in FIG. 5 indicate the direction of airflow flowing into the heat dissipation fans 31. With reference to FIGS. 1-5, in some embodiments, the cover 13 includes a top wall 131 and a peripheral wall 132 extending downwards from a periphery of the top wall 131. The top wall 131 may protrude upwards from a top surface 10a of the cabinet 10, that is, the top wall 131 is higher than the top surface 10a of the cabinet 10, which not only does not occupy space, but also can dissipate heat well. The heat dissipation holes above include a plurality of air inlet holes 133 provided in a first side wall of the peripheral wall 132 and a plurality of air outlet holes 134 provided in a second side wall of the peripheral wall 132 opposite to the first side wall, so as to allow the airflow driven by the heat dissipation fans 31 to enter the containing space 14 through the air inlet holes 133 and flow out through the air outlet holes 134, and thus forced convection heat dissipation is carried out on the electromagnetic generation module 21. That is, the air inlet holes 133 and the air outlet holes 134 may be disposed on two opposite side walls of the cover 13 to facilitate the airflow forming a convection effect, so that the flow rate of the airflow is increased, and the heat dissipation efficiency of the electromagnetic generating module 21 is further improved.

In some embodiments, a plurality of heat dissipation fins 32 are further provided in the containing space 14 for assisting in dissipating heat from the electromagnetic generation module 21. The arrangement of the heat dissipation fins 32 may increase the heat dissipation area of the electromagnetic generation module 21, so that the heat dissipation efficiency and the heat dissipation effect of the electromagnetic generation module 21 are further improved.

Further, the plurality of heat dissipation fins 32 are disposed side by side at intervals on a surface of the electromagnetic generation module 21 so as to be directly thermally connected with the electromagnetic generation module 21, thereby improving the transfer efficiency of heat from the electromagnetic generation module 21 to the heat dissipation fins 32. The side-by-side direction of the plurality of heat dissipation fins 32 is set such that a gap between every two adjacent heat dissipation fins 32 coincides with a flow direction of the airflow in the containing space 14, so that the airflow flows through the gap between every two adjacent heat dissipation fins 32 and then flows out through the air outlet holes 134. Thus, on one hand, the resistance effect of the heat dissipation fins 32 on flow of the airflow can be reduced, and the flow rate of the airflow is improved. On the other hand, sufficient contact between the airflow and the heat dissipation fins 32 can be guaranteed, so that it is guaranteed that the airflow carries away more heat.

Specifically, the flow direction of the airflow in the containing space 14 is from the air inlet holes 133 to the air outlet holes 134. The gap between every two adjacent heat dissipation fins 32 penetrates in the direction pointing from the air inlet holes 133 to the air outlet holes 134, and the side-by-side direction of the plurality of heat dissipation fins 32 is perpendicular to the direction pointing from the air inlet holes 133 to the air outlet holes 134.

In some embodiments, the heat dissipation fans 31 and the plurality of heat dissipation fins 32 are all disposed on an upper surface of the electromagnetic generation module 21. The heat dissipation fans 31 are located on sides of the heat dissipation fins 32 adjacent to the air inlet holes 133, and air outlets of the heat dissipation fans 31 face towards the plurality of heat dissipation fins 32, so that external airflow is promoted to flow to the heat dissipation fins 32.

In some embodiments, two heat dissipation fans 31 are provided. The two heat dissipation fans 31 are disposed side by side in the side-by-side direction of the plurality of heat dissipation fins 32 to ensure that airflow evenly flows through the plurality of heat dissipation fins 32. In some alternative embodiments, one or three or more heat dissipation fan(s) 31 may be provided.

In some embodiments, the cover 13 further includes a water retaining rib 135 extending downwards from the top wall thereof and adjacently located on an inner side of the peripheral wall thereof, so as to prevent external water from entering the containing space 14. Due to the arrangement of the cover 13, the electromagnetic generation module 21 may be prevented from being sprinkled by water or sticking dust and the like to a certain extent. The water retaining rib 135 is particularly designed in the cover 13, and the water retaining rib 135 is located on the inner side of the peripheral wall of the cover, so that water at the top of the cabinet 10 can be prevented from immersing into the containing space 14, causing the electromagnetic generation module 21 to be affected by damp and dust deposit and even causing unnecessary potential safety hazards. Specifically, the water retaining rib 135 may extend downwards to abut against the top surface 10a of the cabinet 10 or extend downwards to abut against the bottom wall of the containing groove 12, so as to play a better waterproof role.

In some embodiments, the water retaining rib 135 surrounds the periphery of the electromagnetic generation module 21. That is, the water retaining rib 135 has four rib plates connected in sequence, so as to prevent water from entering the electromagnetic generation module 21 from any one side. Through holes 1351 are provided in the rib plates of the water retaining rib 135 opposite to the first side wall and the second side wall of the peripheral wall respectively to allow airflow to flow therethrough, so that it is guaranteed that arrangement of the water retaining rib 135 does not affect normal flow of the airflow.

In some embodiments, a storage device 40 with a cylinder 41 and a door 42 is placed in one of the storage compartments 11. A heating cavity is formed in the storage device 40. During heating treatment, the door 42 closes the cylinder 41, so that a closed heating cavity is formed, and electromagnetic leakage is avoided.

Further, the electromagnetic heating device further includes a radiation antenna 22 and a signal processing and measurement control circuit 23 which are disposed in the cylinder 41. The radiation antenna 22 is electrically connected with the signal processing and measurement control circuit 23. The electromagnetic generation module 21 is electrically connected with the signal processing and measurement control circuit 23 through a wire 50 predisposed in a foaming layer of the cabinet 10 and then is electrically connected with the radiation antenna 22.

Specifically, the signal processing and measurement control circuit 23 is provided with a first radio frequency port 231 and a first signal transmission interface 232 which are led out from a rear wall of the storage device 40. The electromagnetic generation module 21 is provided with a second radio frequency port 211 and a second signal transmission interface 212. The first radio frequency port 231 is connected with the second radio frequency port 211 through a radio frequency cable predisposed in the foaming layer of the cabinet 10, and the first signal transmission interface 232 is connected with the second signal transmission interface 212 through a signal transmission cable predisposed in the foaming layer of the cabinet 10.

The cylinder 41 may be provided with a take-and-place opening for facilitating the taking and placing of objects. The door 42 may include an end plate with conductivity. When the door 42 is closed, the end plate closes the take-and-place opening of the cylinder 41, thereby closing the heating cavity in the cylinder 41. The end plate may be a metal end plate made of a conductive metal material or may be a conductive end plate made of other conductive materials. The door 41 further includes at least one conductive connector electrically connected with the end plate. The conductive connector is configured to be electrically connected with the cylinder 41 at least when the door 42 is in a closed state of closing the take-and-place opening of the cylinder 41, so that the cylinder 41 and the door 42 form a continuously conductive shield when the door 42 is in the closed state. Therefore, it can be guaranteed that stable electrical connection is formed between the cylinder 41 and the door 42, so that the continuously conductive shield is formed during heating, electromagnetic waves are prevented from being emitted through a gap, electromagnetic radiation is effectively shielded, and damage of electromagnetic radiation to a human body is eliminated. The cylinder 41 may be a metallic cylinder or a non-metallic cylinder provided thereon with electromagnetic shielding features, such as a conductive coating, a conductive metal mesh, and the like.

Those skilled in the art should understand that unless otherwise stated, the terms such as "top," "bottom," "inside," "outside," "transverse," "front," "back" and the like used for representing orientation or position relationships in the embodiments of the present invention are based on the practical use state of the refrigerating and freezing device 1. The terms are used merely to facilitate the description and understanding of the technical solution of the present invention rather than indicating or implying that the mentioned device or components need to have a particular orientation. Therefore, such terms should not be construed as limitation of the present invention.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from contents disclosed in the present invention. Therefore, the scope of the present invention should be understood and deemed to cover all such other variations or modifications.

The invention claimed is:

1. A refrigerating and freezing device, comprising:
   a cabinet, wherein at least one storage compartment is defined therein, and a heating cavity configured to contain a to-be-processed object is defined in one of the storage compartments; and
   an electromagnetic generation module configured to produce an electromagnetic wave signal such that electromagnetic waves are generated based on the electromagnetic wave signal to be supplied into the heating cavity so as to heat the to-be-processed object in the heating cavity,
   wherein a containing groove with an upward opening is provided in a top of the cabinet, the opening of the containing groove is covered with a cover so as to define a containing space between the containing groove and the cover, and heat dissipation holes configured to achieve communication between the containing space and an external environment where the cabinet is located are provided in the cover;
   wherein the electromagnetic generation module is disposed in the containing space, and a heat dissipation fan is further provided in the containing space and is configured to drive airflow to flow between the containing space and the external environment where the cabinet is located through the heat dissipation holes, so as to dissipate heat from the electromagnetic generation module;
   wherein the cover comprises a top wall and a peripheral wall extending downwards from a periphery of the top wall; and
   wherein the heat dissipation holes comprise a plurality of air inlet holes provided in a first side wall of the peripheral wall and a plurality of air outlet holes provided in a second side wall of the peripheral wall opposite to the first side wall, so as to allow the airflow driven by the heat dissipation fan to enter the containing space through the plurality of air inlet holes and flow out through the plurality of air outlet holes, and thus forced convection heat dissipation is carried out on the electromagnetic generation module.

2. The refrigerating and freezing device according to claim 1, wherein a plurality of heat dissipation fins are further provided in the containing space for assisting in dissipating heat from the electromagnetic generation module.

3. The refrigerating and freezing device according to claim 2, wherein the plurality of heat dissipation fins are disposed on a surface of the electromagnetic generation module side by side at intervals; and wherein the side-by-side direction of the plurality of heat dissipation fins is set such that a gap between every two adjacent heat dissipation fins coincides with a flow direction of the airflow in the containing space, so that the airflow flows through the gap between every two adjacent heat dissipation fins and then flows out through the air outlet holes.

4. The refrigerating and freezing device according to claim 3, wherein the heat dissipation fan and the plurality of heat dissipation fins are all disposed on an upper surface of the electromagnetic generation module, the heat dissipation fan is located on one side of the heat dissipation fins adjacent to the air inlet holes, and an air outlet of the heat dissipation fan faces towards the plurality of heat dissipation fins.

5. The refrigerating and freezing device according to claim 4, wherein two heat dissipation fans are provided, and the two heat dissipation fans are disposed side by side in the side-by-side direction of the plurality of heat dissipation fins.

6. The refrigerating and freezing device according to claim 1, wherein the cover further comprises a water retaining rib extending downwards from the top wall thereof and adjacently located on an inner side of the peripheral wall thereof, so as to prevent external water from entering the containing space.

7. The refrigerating and freezing device according to claim 6, wherein the water retaining rib surrounds the periphery of the electromagnetic generation module, and rib plates of the water retaining rib opposite to the first side wall and the second side wall are provided with through holes respectively to allow airflow to flow therethrough.

8. The refrigerating and freezing device according to claim 1, wherein a storage device with a cylinder and a door is placed in one of the storage compartments, and the heating cavity is formed in the storage device; and wherein the refrigerating and freezing device further comprises a radiation antenna and a signal processing and measurement control circuit which are disposed in the cylinder, the radiation antenna is electrically connected with the signal processing and measurement control circuit, and the electromagnetic generation module is electrically connected with the signal processing and measurement control circuit through a wire predisposed in a foaming layer of the cabinet and then is electrically connected with the radiation antenna.

9. The refrigerating and freezing device according to claim 8, wherein the signal processing and measurement control circuit is provided with a first radio frequency port and a first signal transmission interface which are led out from a rear wall of the storage device, the electromagnetic generation module is provided with a second radio frequency port and a second signal transmission interface, the first radio frequency port is connected with the second radio frequency port through a radio frequency cable predisposed in the foaming layer of the cabinet, and the first signal transmission interface is connected with the second signal transmission interface through a signal transmission cable predisposed in the foaming layer of the cabinet.

10. A refrigerating and freezing device, comprising:

a cabinet, wherein at least one storage compartment is defined therein, and a heating cavity configured to contain a to-be-processed object is defined in one of the storage compartments; and an electromagnetic generation module configured to produce an electromagnetic wave signal such that electromagnetic waves are generated based on the electromagnetic wave signal to be supplied into the heating cavity so as to heat the to-be-processed object in the heating cavity, wherein a containing groove with an upward opening is provided in a top of the cabinet, the opening of the containing groove is covered with a cover so as to define a containing space between the containing groove and the cover, and heat dissipation holes configured to achieve communication between the containing space and an external environment where the cabinet is located are provided in the cover;

wherein the electromagnetic generation module is disposed in the containing space, and a heat dissipation fan is further provided in the containing space and is configured to drive airflow to flow between the containing space and the external environment where the cabinet is located through the heat dissipation holes, so as to dissipate heat from the electromagnetic generation module;

wherein a storage device with a cylinder and a door is placed in one of the storage compartments, and the heating cavity is formed in the storage device;

wherein the refrigerating and freezing device further comprises a radiation antenna and a signal processing and measurement control circuit which are disposed in the cylinder, the radiation antenna is electrically connected with the signal processing and measurement control circuit, and the electromagnetic generation module is electrically connected with the signal processing and measurement control circuit through a wire predisposed in a foaming layer of the cabinet and then is electrically connected with the radiation antenna; and wherein the signal processing and measurement control circuit is provided with a first radio frequency port and a first signal transmission interface which are led out from a rear wall of the storage device, the electromagnetic generation module is provided with a second radio frequency port and a second signal transmission interface, the first radio frequency port is connected with the second radio frequency port through a radio frequency cable predisposed in the foaming layer of the cabinet, and the first signal transmission interface is connected with the second signal transmission interface through a signal transmission cable predisposed in the foaming layer of the cabinet.

* * * * *